Jan. 8, 1935.　　　F. M. POOLE　　　1,987,311
FURNACE CONTROL
Filed Sept. 10, 1930　　2 Sheets-Sheet 1

INVENTOR
FOSTER M. POOLE
ATTORNEY
John E. Hubbell

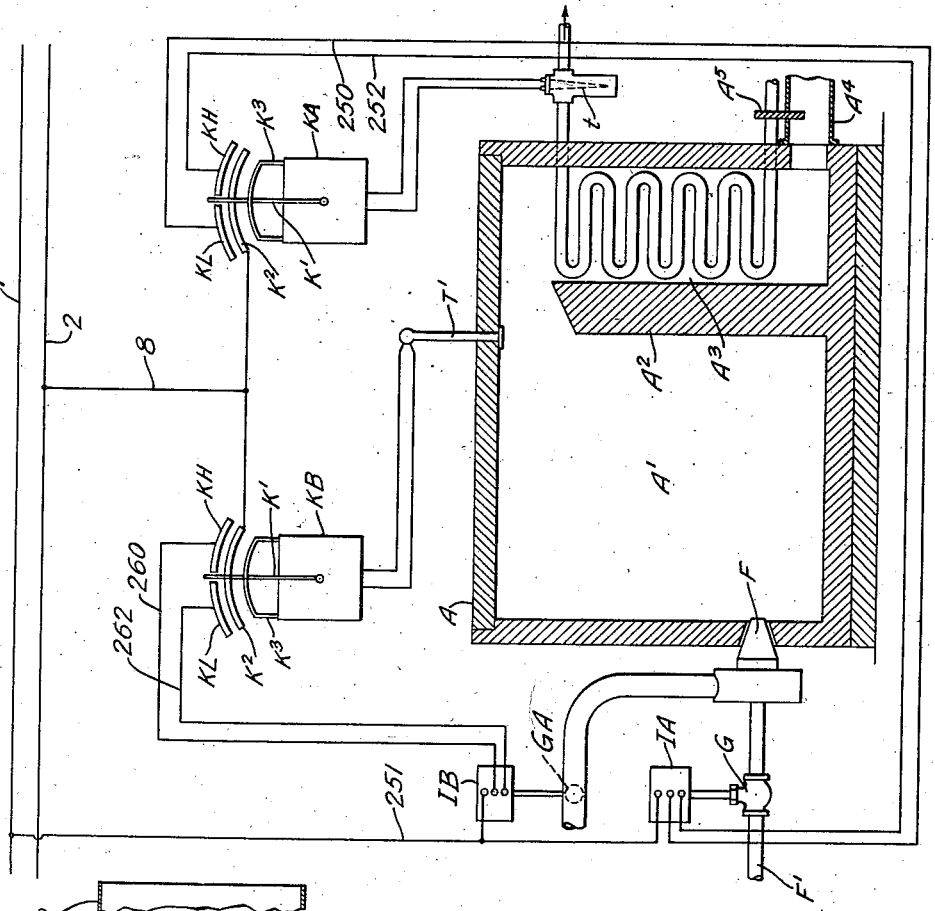
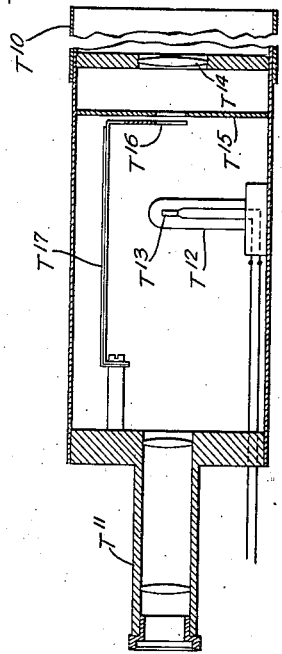

Patented Jan. 8, 1935

1,987,311

UNITED STATES PATENT OFFICE 1,987,311

FURNACE CONTROL

Foster M. Poole, Kansas City, Mo., assignor to The Brown Instrument Company, Philadelphia, Pa., a corporation of Pennsylvania Application September 10, 1930, Serial No. 481,020

4 Claims. (Cl. 236—70)

The general object of the present invention is to provide an improved system of furnace control, especially adapted for use in controlling combustion conditions in so-called continuous oil heaters or tube stills and analogous furnaces.

In accordance with the present invention, combustion conditions are automatically controlled by apparatus including devices responsive to temperature conditions. For the attainment of some of the advantages of the present invention, the temperature responsive devices employed may all be thermo-couples or analogous devices. A specific object of the present invention, however, is to make the control of combustion conditions dependent upon furnace temperature conditions to which ordinary thermo-couples and analogous devices do not give a true response. For the attainment of that object, I make use of temperature responsive devices which are primarily responsive to the effect of radiant heat as are the so-called radiation pyrometers.

I believe myself the first to make direct use of a radiation pyrometer as an actuating element in the automatic control of combustion conditions in such a furnace as a continuous oil heating furnace in which a material is rapidly and continuously heated to a delivery temperature which should be held within relatively narrow limits. By the use of such a control instrumentality, I am able to make the control of combustion conditions more directly responsive to flame temperatures, as distinguished from furnace temperatures developed as a result of the flame temperatures, than is possible with control systems heretofore known and used.

Control of combustion by means of devices wholly or largely responsive to radiant heat is of especial utility in connection with furnaces such as modern oil heating furnaces in which combustion is so carried out and heat is so absorbed as to insure unusually high combustion temperatures, and the absorption of an unusually large portion of the total amount of the heat absorbed in the form of radiant energy, in distinction to heat absorption by contact of heated gases with heat absorbing surfaces.

As is well known in the art, satisfactorily complete combustion of fuel in any ordinary furnace requires excess air, that is, air in excess of the theoretical amount required for chemical union with the fuel. Any increase in the amount of excess air beyond that necessary to insure substantially complete combustion of the fuel tends to a reduction in the temperature of combustion and thereby to a marked reduction in the amount of radiant heat absorbed in the furnace, and to a substantial, though less marked, reduction in the thermal efficiency of the furnace.

The extent to which the excess air can be reduced is limited, however, not merely by the practical necessity of insuring substantially complete combustion of the fuel, but also by the necessity for guarding against dangerous overheating of the heat absorbing surface of the furnace and even of its refractory parts. Unless the amount of excess air is unduly large, any reduction in the excess air percentage tends to delayed combustion, and the more or less frequent occurrence of flame tongues and flame bursts in portions of the furnace which would be traversed only by products of combustion if the amount of excess air were appreciably greater.

With a control system including one or more suitably located devices responsive wholly or largely to radiant heat, it is possible to guard against the destructive effects of flame bursts or tongues in portions of the furnace where continuing or frequently occurring flame bursts or tongues would result in dangerous overheating. The use of control actuating devices responsive to radiant heat in accordance with the present invention, thus makes it practically possible to safely operate with a smaller excess air ratio than would otherwise be practically possible without serious risk of local overheating.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Of the drawings:—

Fig. 2 is a sectional elevation of one of the pyrometers employed in Fig. 1; and Fig. 3 is a diagrammatic representation of an oil heater with a modified control system.

Figure 1:
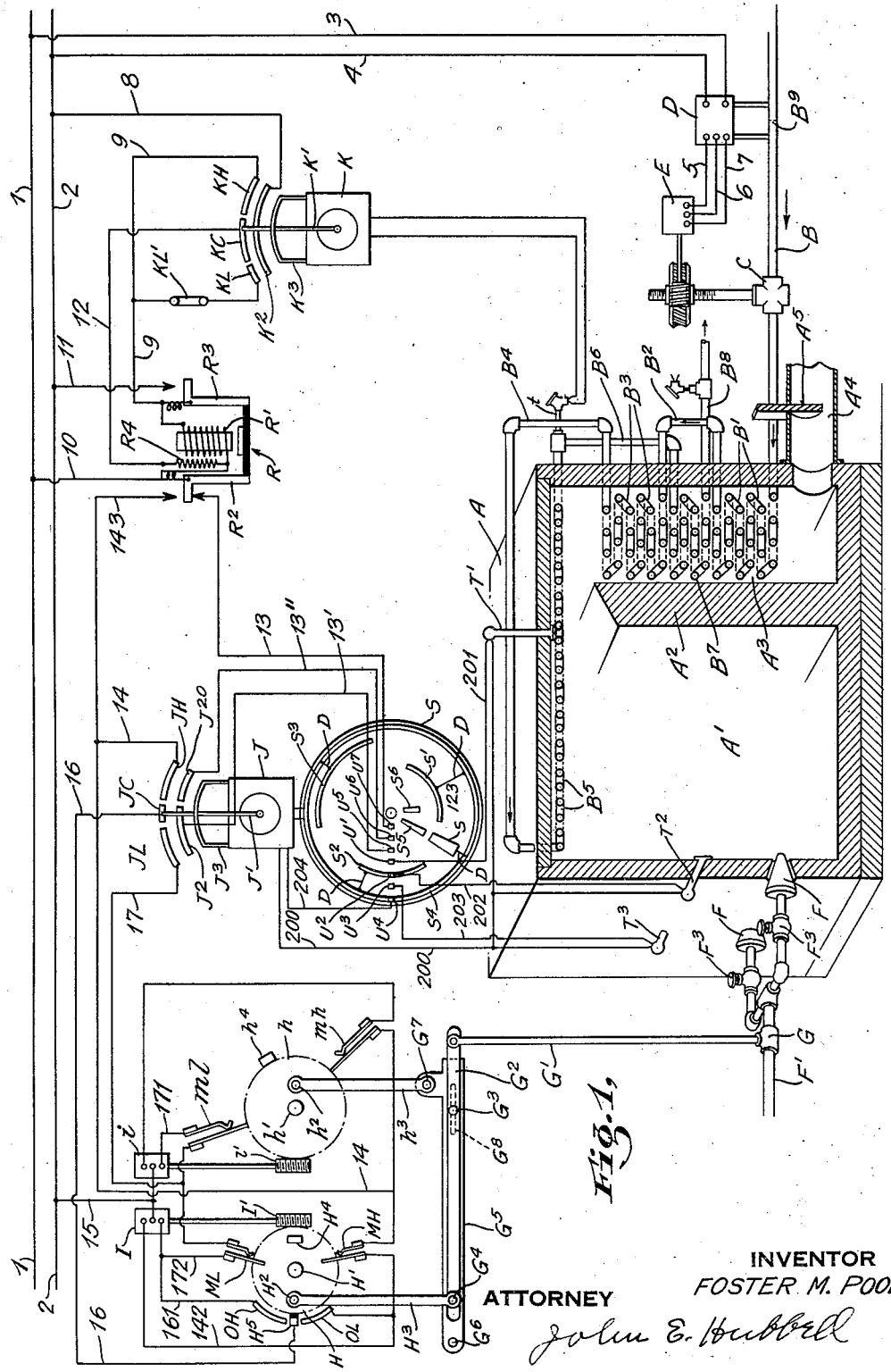
Fig. 1 is a diagrammatic representation of an oil heater and its control system.

In Fig. 1 I have illustrated the use of one embodiment of the present invention in connection with a diagrammatically illustrated oil heater or tube still A of conventional type comprising a combustion chamber A' separated from a chamber $A^3$ by a bridge wall $A^2$, over which the heating gases pass from the chamber A' into the chamber $A^3$, a considerable portion of the heat generated being absorbed by the walls of tubes located in the chamber A³ and through which the oil heated is passed. The products of combustion escape from the lower end of the chamber A³ through a stack outlet connection A⁴ provided with a regulating damper A⁵.

As shown, the oil to be heated is supplied by a pipe B which leads to the bottom of a bank of tubes B' located in the lower portion of the chamber A³. The oil after passing through tubes in the bank B' passes through a pipe B² to the bottom of a tube bank B³ within and adjacent the upper end of the chamber A³. The oil after travelling through the tubes B³ passes through a pipe B⁴ to tubes B⁵ lining the roof of the furnace and extending over the chambers A' and A³ and the bridge wall A². The oil after passing through the roof tubes B⁵ is conducted by a pipe B⁶ to the top of a bank of tubes B⁷ located between the banks B² and B³ in the chamber A². From the tubes B⁷, the oil leaves the heater through the outlet pipe B⁸.

The oil entering the heater through the pipe B is controlled by a regulating valve C. In the contemplated operation of the particular form of apparatus shown in Fig. 1, the valve C is automatically adjusted as required to maintain a constant rate of oil flow through the heater tubes. To this end a flow measuring instrument D is connected to the pipe B at opposite sides of a restricted orifice B⁹ therein so as to respond to a pressure differential which is a function of the rate of flow through the pipe B. The instrument D as diagrammatically illustrated, includes means for operatively connecting one or another pair of the terminals 5, 6 and 7 of a reversible motor E to branch conductors 3 and 4 from current supply conductors 1 and 2, respectively, so that the motor E will run in one direction and adjust the valve C in the closing direction when the oil feed rises above the normal rate, and will run in the opposite direction and give the valve C an opening adjustment when the oil feed diminishes below the normal or predetermined rate.

As diagrammatically illustrated, the furnace A is heated by the combustion of fluid fuel supplied to spaced apart burners F at a rate primarily dependent upon the adjustment of an automatically controlled regulating valve G in a fuel supply pipe F'. Preferably each burner F is connected to the supply pipe F' through a separate manually controlled regulating valve F³. In the arrangement shown in Fig. 1, the rate at which combustion supporting air is supplied, is manually controlled, as by the adjustment of the damper A⁵ in the heating gas outlet or stack connection A⁴.

With the apparatus illustrated in Fig. 1, the rate of fuel supply is normally controlled through the valve G in accordance with the average of the temperatures to which temperature responsive devices T', T² and T³ are subjected. For the attainment of important advantages of the present invention the devices T', T² and T³, and particularly the device T', should be wholly or largey responsive to radiant heat, and the devices T', T² and T³ may well be similar radiation pyrometers of the type illustrated in Fig. 2. The device T' is located above the bridge wall A² and may be arranged to respond to the general temperature conditions prevailing above the bridge wall, and in particular to give a significant response to flame tongues or bursts in the space above the bridge wall. For the purposes of the present invention it is possible, also, and may sometimes be desirable, to arrange the device T' so that it responds primarily to the temperature of the outer surface of the adjacent portions of the roof tubes B⁵. The radiation pyrometers T² and T³ are arranged to respond to temperatures in the portions of the combustion chamber A' wherein the temperatures are directly and significantly affected by the burners F in proximity to which the devices T² and T³ are respectively located.

While the control of the heat supplied to the furnace is normally dependent, with the apparatus in Fig. 1, upon the average of the temperature to which the devices T', T² and T³ are subjected, the control mechanism shown in Fig. 1 includes provisions for reducing the supply of fuel whenever the temperatures to which the device T' responds becomes dangerously high.

With the rate of fuel supply regulated to maintain approximately constant average furnace temperature conditions and with the oil to be heated supplied to an approximately constant rate; the temperature to which the oil is heated in the heater should be approximately constant, but in practice the exit oil temperature occasionally tends to become unduly high. I have included in the apparatus shown in Fig. 1, means for reducing the fuel supply when necessary to prevent the oil passing through the tubes B, B', etc., from being heated to a higher temperature than is desirable. To this end, I employ a thermo-couple t, or analogous temperature responsive device to measure the oil temperature at some suitable point in the path of oil flow. In some cases, I consider it advantageous to locate the thermo-couple t as shown, so that it responds to the temperature of the oil leaving the roof tubes B² through the pipe B⁶.

The radiation pyrometers T', T² and T³ may be of any usual or suitable construction. As conventionally shown in Fig. 2, the pyrometer T' comprises a tubular casing with a portion T¹⁰ projecting into the furnace chamber, and with a sighting extension T¹¹ at its opposite end, though the use of a sighting device is not ordinarily essential. Within the casing of the pyrometer is located a hollow transparent bulb T¹² enclosing a thermo-couple T¹³ on which radiant heat rays from the furnace are converged by means of a lens T¹⁴. T¹⁵ represents an apertured disc screen, and T¹⁶ represents a shutter adjusted by a thermostatic device T¹⁷ to obstruct the aperture in the disc T¹⁵ more or less as required to compensate for the effect of local heating; that is for the effect of heat transmitted to the thermo-couple through the casing of the device T'.

In accordance with the present invention, I preferably locate the pyrometer T² so that it will receive heat rays emanating wholly or mainly from the burning fuel supplied by the adjacent burner F, and the pyrometer T³ is similarly responsive to heat rays emanating from the burning fuel supplied by the other of the two burners F. As shown, the two burners F are located adjacent opposite ends of the combustion chamber, and the devices T² and T³ are similarly located. While each of the pyrometers T² and T³, located as shown, will receive radiant heat emanating, or reflected from a portion of the bridge wall A² in front of the pyrometer, it will also be significantly affected by, and will give an indication of flame temperatures and combustion conditions due to the operation of the particular burner F with which it is associated. While the effect on any such pyrometer of heat radiation from the burning gases or flame bursts is diminished by cloudiness of the gases traversed by the rays, and is increased as the clarity of those gases is increased, in general the thermo-couple voltage of each of the pyrometers $T^2$ and $T^3$ will increase and decrease on increases and decreases in the temperature of the combustion gases in the space from which it receives heat rays in significant amounts.

Similarly, when the pyrometer $T'$ is arranged to receive heat rays emanating or reflected from the top of the bridge wall $A^2$, and heat rays from the burning gases passing over the bridge wall, the pyrometer will respond significantly to the development of flame temperatures in the space above the bridge wall. The response is especially important in the type of furnace illustrated, because flame tongues or flame bursts impinging against or occurring in close proximity to portions of the tubes $B^5$ above the bridge wall, are especially apt to produce injurious overheating, as those tube portions receive a large amount of radiant heat in any event, and are also subjected to a large convection heating effect due to the concentration in gas flow over the bridge wall. A direct and significant response to conditions tending to injurious overheating of the tubes immediately above the bridge wall may also be secured by arranging the pyrometer $T'$ so that it will receive heat rays wholly or largely from the surfaces of the portions of the tubes $B^5$ above the bridge wall, since in such case the temperatures of said surfaces increase on a substantial increase in their rate of heat absorption. Flame tongues playing over those surfaces also greatly increase the amount of radiant energy transmitted through the lens $T^{14}$ of the pyrometer $T'$.

A control system including the temperature responsive devices $T'$, $T^2$ and $T^3$ and functioning in the general manner which has been described, may take various forms and include various forms and combinations of instruments, relays and other control system elements. Advantageously, and as shown, the control apparatus shown in Fig. 1 comprises many parts which are included in and functions in many respects like the control system of my prior application Serial No. 393,392, filed September 18th, 1929.

In Fig. 1, J represents a control instrument including a galvanometer for measuring and exercising control functions in response to potential differences impressed upon the galvanometer. Ordinarily and preferably, the instrument J is a recording instrument, but I have thought it unnecessary to illustrate herein details of the recording mechanism of the instrument, since such details may be of well known form and constitute no part of the present invention. The instrument J as conventionally shown, comprises a periodically actuated depressor $J^3$ for depressing the galvanometer pointer $J'$ and thereby cause the latter to connect a control contact $J^2$ to one or another of control contacts JL or JC, accordingly as the galvanometer deflection is low or normal, and to connect control contacts $J^{20}$ and JH when the galvanometer deflection is high. In the type of instrument shown, the depression of the pointer $J'$ by the depressor $J^3$ ordinarily results in the production of a record impression by the pointer $J'$ on a record surface (not shown).

Associated with the instrument J and operated in synchronism with the depressor $J^3$, is a switch mechanism diagrammatically shown as comprising a rotating disc S. The latter carries contacts $S'$, $S^2$, $S^3$, $S^4$, $S^{123}$, $S^5$, and $S^6$. The contacts $S'$, $S^2$ and $S^3$ engage stationary brushes $U'$, $U^2$ and $U^3$, respectively, during successive portions of each revolution of the disc S. The contact $S^4$ is continuous and constantly engages a stationary brush $U^4$. The contacts $S'$, $S^2$, $S^3$ and $S^{123}$ are each permanently connected by conductors to the contact $S^4$. The contact $S^{123}$ simultaneously engages the brushes $U'$, $U^2$ and $U^3$ for a brief period during each revolution of the disc S. During a portion of the period in which such engagement occurs the contact $S^5$ engages and connects three stationary brushes $U^5$, $U^6$ and $U^7$. While the contact $S'$ is in engagement with the brush $U'$, the contact $S^6$ also engages and connects the brushes $U^6$ and $U^7$. The contacts $S^5$ and $S^6$ are so arranged that the contact $S^6$ engages the brushes $U^6$ and $U^7$ almost immediately after the contact $S^5$ moves out of engagement with said brushes.

As diagrammatically illustrated, one terminal, for example the negative terminal, of each of the thermo-couples $T^{13}$, of the pyrometers $T'$, $T^2$ and $T^3$, is permanently connected by a conductor 200 to one galvanometer terminal of the instrument J. The other or positive terminal of the thermo-couple of the device $T'$ is connected by a conductor 201 to the switch contact $U'$. Similarly, the positive terminals of the thermocouples of the devices $T^2$ and $T^3$ are connected by conductors 202 and 203 to the brushes $U^2$ and $U^3$, respectively. The second galvanometer terminal of the instrument J is permanently connected by a conductor 204 to the brush $U^4$.

With the above described arrangement, when the rotation of the disc S brings the contact $S'$ into engagement with the brush $U'$, the thermo-couple pertaining to the pyrometer $T'$ is connected to the galvanometer terminals of the instrument J and the latter will then measure, and if the instrument is a recording instrument will record, the temperature to which the device $T'$ then responds. Similarly, as the contacts $S^2$ and $S^3$, respectively, engage the brushes $U^2$ and $U^3$, the instrument J measures the temperatures to which the pyrometers $T^2$ and $T^3$ are respectively subjected. When the contact $S^{123}$ simultaneously engages the brushes $U'$, $U^2$ and $U^3$ the positive terminals of the three thermo-couples associated with the pyrometers $T'$, $T^2$ and $T^3$ are each connected through the conductor $T^{204}$ to one galvanometer terminal of the instrument J. When the three thermo-couples are thus connected in multiple to the galvanometer terminals, the instrument J measures the average of the three thermo-couple voltages, and hence the average of the temperatures to which the pyrometers $T'$, $T^2$ and $T^3$ are subjected.

The instrument J can exert control effects only when the brushes $U^5$, $U^6$ and $U^7$ are connected by the contact $S^5$ and the control contacts $J^2$ and $J^{20}$ of the instrument J are thereby energized, or when the brushes $U^6$ and $U^7$ are connected by the contact $S^6$, and the contact $J^{20}$ is thereby energized. The energizing circuit for the contact $J^2$ comprises a conductor 13 normally connecting the brush $U^7$ to the supply conductor 1, and a conductor 13' connecting the brush $U^5$ to the contact $J^2$. The energizing circuit for the contact $J^{20}$ comprises the conductor 13, brush $U^7$, brush $U^6$, and a conductor 13'' connecting the brush $U^3$ to the contact $J^{20}$.

The particular mechanism shown in Fig. 1 through which the instruments J and K effect adjustments of the valve G comprises a floating lever $G^2$ pivotally connected at one end to the stem $G'$ of the valve G. At its opposite end, the lever $G^2$ is connected by a link $H^3$ to a crank pin $H^2$ carried by a crank disc H mounted on a shaft $H'$. Intermediate its ends, the lever $G^2$ is pivotally mounted on a fulcrum pin $G^3$. The latter is carried by a lever $G^5$ pivoted to turn about the stationary fulcrum pin $G^6$, and pivotally connected at $G^7$ to a link $h^3$, by which the lever $G^5$ is connected to a crank pin $h^2$ carried by the crank disc $h$ mounted on a shaft $h'$. As shown, the fulcrum pin $G^3$ is adjustably mounted in a slot $G^8$ extending longitudinally of the lever $G^5$ to permit adjustment of the effects of given disc movements on the position of the valve stem $G'$. With the arrangement described, a rotation of either disc in the counterclockwise direction gives the valve G an opening adjustment. The normal angular movement of each of the discs is within a range somewhat less than 180°, the limits of the disc movements being fixed as hereinafter explained by engagements of projections $H^4$ and $h^4$ carried by the discs H and $h$, respectively, with corresponding limit switches which, as hereinafter described, interrupt the energization of the motors effecting the disc movements.

The crank disc H is given its rotative movements by a reversible relay motor I diagrammatically shown as operatively connected to the disc H by a worm $I'$ carried by the motor shaft and in mesh with worm gear teeth provided at the periphery of the disc H. The disc $h$ is similarly geared to and operated by a reversible relay motor $i$, the shaft of which carries a worm $i'$ in mesh with worm gear teeth formed on the periphery of the disc $h$.

The energization of the motor H for operation in either direction produces a substantial adjustment of the valve stem $G'$ in a relatively short period of time, whereas the energization of the motor $h$ during a similarly short period of time produces a relatively small adjustment of the stem $G'$ of the valve G. This difference in the operative effects of the motors H and $h$ may be obtained as indicated in the drawings, by making the diameter of the disc H smaller than the diameter of the disc $h$, and by locating the crank pin $H^2$ at a greater distance from the shaft $H'$ than separating the crank pin $h^2$ and shaft $h'$, and by making the pitch of the worm $I'$ coarser than the pitch of the worm $i'$. As those skilled in the art will understand, however, it will ordinarily be desirable in practice to provide speed reducing gear connections between the relay motor shafts and the crank discs H and $h$ driven by them which are capable of a greater speed reduction than the simple worm and worm gear connections diagrammatically shown in the drawings. With whatever forms of gear connection may be employed the parts may well be proportioned and arranged so that the full valve adjustment obtainable by the operation of the relay motor I may be obtained in a fraction of a minute while the full valve adjustment obtainable by the operation of the motor $i$ may require several minutes.

In normal operation, the energization of the motors I and $i$ for operation in either direction, is controlled by the instrument J. Whenever in normal operation the contact $S^{123}$ of the disc S connects the brushes $U'$, $U^2$ and $U^3$ and the average temperatures to which the pyrometers $T'$, $T^2$ and $T^3$ are then subjected is above the normal average, so that the pointer $J'$ of the instrument J is then above the control contact JH and connects the contacts $J^{20}$ and JH, the motors I and $i$ are energized so that each motor turns in a direction giving a closing adjustment to the valve G. The energizing circuit for the motor $i$ thus closed comprises the supply conductor 1, branch conductor 10, relay contact $R^2$, conductor 13, brushes $U^6$ and $U^7$, conductor $13^{11}$, contact $J^{20}$, contact JH, conductor 14, limit switch $mh$, conductor 141 connecting switch $mh$ to one terminal of the motor $i$, and conductor 15 connecting a second terminal of the motor $i$ to the supply conductor 2. The energizing circuit for the motor I established when the motor $i$ is energized as just described, comprises the conductor 14 and its above mentioned connections to the supply conductor 1, the limit switch MH to which the conductor 14 is also connected, the conductor 142 connecting the switch MH to one terminal of the motor I, and the conductor 15, which is connected to one terminal of the motor I as well as to one terminal of the motor $i$.

When, following the operations just described and the resultant drop in furnace temperature, the pointer $J'$ is depressed into engagement with the contact JC, the pointer then connects the contacts $J^2$ and JC. This does not bring the motor $i$ into operation, but closes an energizing circuit for the motor I, which is thereby actuated to return the crank disc H into the intermediate position shown in the drawings. The last mentioned energizing circuit comprises the supply conductor 1, branch conductor 10, relay armature $R^2$, conductor 13, brushes $U^5$ and $U^6$, conductor $13'$, contact $J^2$, contact JC, conductor 16, a contact $H^5$ carried by the disc H, a contact OH, a conductor 161 connecting the contact OH to the third terminal of the motor I, conductor 15, and supply conductor 2. The effect of thus returning the crank disc H to its intermediate position with the substantial opening adjustment thereby imparted to the valve G, tends to check the decrease in furnace temperature which resulted in the adjustment, and thus tends to eliminate hunting. The contact OH is a stationary arc shaped contact engaged by the contact $H^5$ in any position of the disc H into which the latter may move in the clockwise direction from the intermediate position shown in the drawings. A similar contact OL is engaged by the contact $H^5$ in any position of the disc H into which the latter may be moved in the counter-clockwise direction from the intermediate position shown in the drawings.

No further valve adjustments are effected by the instrument J so long as the pointer $J'$ remains above the contact JC. If the pointer $J'$ again moves into position above the contact JH, the previously described valve adjusting operations are repeated. If the furnace temperature falls sufficiently to move the pointer $J'$ into a position above the contact JL, another set of valve adjusting operations, tending to restore the temperature to its normal value, is effected.

The valve adjusting operations effected when the pointer $J'$ connects the contacts $J^2$ and JL, are generally similar to those produced when the contacts $J^{20}$ and JH are connected, except that they are in the reverse direction. On the first operative connection of the contacts $J^2$ and JL after the pointer $J'$ moves above the latter, both motors I and $I'$ are energized to rotate the crank discs each in the counter-clockwise direction. The energizing circuit for the motor $i$ then completed comprises supply conductor 1, branch conductor 10, relay armature $R^2$, conductor 13, brushes U⁵ and U⁷, conductor 13', contact J², contact JL, conductor 17, limit switch ml, conductor 171 connecting the switch ml to the third terminal of the motor i, conductor 15, and supply conductor 2. The energizing circuit simultaneously closed for the motor I includes the conductor 17 and its connections to the supply conductor 2, the limit switch ML, and the conductors 172 and 161 connecting switch ML to one terminal of the motor I, the conductor 15, and supply conductor 2. When thus energized, the motor i gives a small valve opening movement to the disc h and the motor I moves the disc H from its intermediate position into the position in which it opens the limit switch ML. Thereafter, so long as the pointer J' remains above the contact JL, no further adjustment of the motor I can occur in normal operation, but the valve opening adjustments effected by the motor i are repeated whenever the depressor J³ operatively connects contacts J² and JL until the furnace temperature rises sufficiently to move the pointer J' out of its position above the contact JL, or until the disc h is adjusted into the position in which the limit switch ml is opened when the pointer J' thereafter moves again into position above the contact JC and is depressed to connect the latter to the contact J², the motor I is operated to return the disc H to its intermediate position. The energizing circuit closed to thus actuate the motor I includes the contact H⁵ and the previously described connections between it and the supply conductor, and also includes the contact OL, the conductor 142 through which that contact is connected to a terminal of the motor I, and the conductor 15 connecting another terminal of the motor I to the supply conductor 2.

The valve adjustments effected under the control of the instrument J as above described, are those which occur under normal operating conditions in which the exit oil temperature does not exceed a normal value, and in which the temperature to which the pyrometer T' responds is not high enough to bring the pointer J' above the contact JH when the galvanometer of instrument J is connected to the terminals of that pyrometer by the engagement of the contact S' with the brush U'. When, with the galvanometer so connected, the temperature to which the pyrometer T' is subjected is higher and the pointer J' connects the control contacts J²⁰ and JH, the same effects are produced as those previously described as occurring when a similar engagement occurs with the brushes U⁶ and U⁷ connected by the contact S⁵. Since the contact S⁶ connects the brushes U⁵ and U⁶ almost immediately after the contact S⁵ connects the brushes U⁵, U⁶ and U⁷, the connection of the contacts J²⁰ and JH by the pointer J' when the contact S⁶ connects the brushes U⁶ and U⁷ almost immediately neutralizes the adjustments previously effected by the instrument J, if the previous adjustments resulted from the connection by the pointer J' of the contact J² to the low contact JL or to the intermediate contact JC. If said previous adjustment has been due to the connection of the controller contacts J²⁰ and JH, the connection of those contacts while the contact S⁶ connects the brushes U⁶ and U⁷, merely effects a further adjustment of the motor i in the valve closing direction.

Under the non-normal operating condition in which the exit oil temperature exceeds a predetermined value, the control instrument K assumes control of the motors I and i, and while exercising its control functions the instrument K prevents the instrument J from exercising any control function dependent upon furnace temperature, and effects adjustments of the valve G tending to quickly reduce the exit oil temperature. The control instrument K may be similar to the control instrument J, except that in the instrument K, a single control contact K² replaces the two contacts J² and J²⁰ of the instrument J. As diagrammatically shown, the instrument K comprises parts K', K³, KL, KC and KH, corresponding respectively, to the parts J', J³, JL, JC and JH of the instrument J. So long as the exit oil temperature to which the thermo-couple T³ responds is within a normal range, the pointer K' will be above the contact KC, and its periodical engagement with that contact effected by the depressor K³ will be idle and without effect upon the control mechanism. On an increase in the exit oil temperature resulting in the operative connection of the contacts K² and KH by the pointer K' an energizing circuit for a relay R is closed, and the energization of that relay results in operations of the motors I and i effecting valve closing adjustments, regardless of the furnace temperature condition to which the control instrument J is then responding.

The relay R may be, and as diagrammatically illustrated, is of a conventional and well known type comprising an energizing coil R', which, when energized, moves the relay contact R² out of engagement with the conductor 13 and into engagement with the conductor 143. When the pointer K' operatively connects contacts K² and KH, it closes an energizing circuit for the relay R, comprising supply conductor 2, branch conductor 8, contact K², contact KH, conductor 9, relay energizing coil R', branch conductor 10, and supply conductor 1. The resultant relay actuation brings another relay contact R³ into engagement with the branch conductor 11, and thereby closes a holding-in circuit for the relay R which maintains the energization of the latter after the subsequent rising movement of the depressor K³, permits the pointer K' to move out of engagement with the contacts K² and KH. This holding-in circuit comprises the supply conductor 2, conductor 11, contact R³, coil R', conductor 10, and supply conductor 1.

The movement of the contact R² out of engagement with the conductor 13 when the relay R is energized, deenergizes the contact J² of the instrument J, and thereby prevents the latter from exercising any control function until the contact R² again engages the conductor 13 and energizes the contact J². The conductor 143 is connected at one end to the conductor 14, and when the energization of the relay R brings the contact R² into engagement with the conductor 143, the conductor 14 is thereby connected by conductor 143, contact R³ and branch conductor 10 to the supply conductor 1. The connection of the conductor 14 to the supply conductor 1 effects the energization of the motors I and i in the manner previously described to start each of the latter into operation in the direction to give valve closing movements to the discs H and h. The movement of the motor i, as well as of the motor I when thus energized, continues without interruption until its full valve closing adjustment is effected, and the limit switches MH and mh are both closed, unless in the meantime, a reduction in the exit oil temperature results in a deenergization of the relay R.

When, following the energization of the relay R, a reduction in the exit oil temperature brings the pointer K' of the instrument K into the position in which it operatively connects the contacts K² and KC, a low resistance shunt is closed about the coil R', and the relay R is thereby deenergized. This low resistance shunt is formed by a conductor 12 including a current limiting resistance R⁴, which connects one terminal of the winding R' to the contact KC, the latter, the contact K², the conductor 8, a section of the supply conductor 12, the branch conductor 11, and the relay contact R³ which connect to the second terminal of the winding R'. The deenergization of the relay R restores the normal condition in which the contact J² is energized and the motors I and $i$ are subject to the control of the instrument J.

The contact KL of the instrument K is a safety device enabling the instrument K to prevent the instrument J from exercising a control function, and to shut off the supply of fuel to the oil heater in case of a break in the thermo-couple $t$ and the resultant movement of the pointer K' into a position which would correspond to an abnormally low exit oil temperature. When, in consequence of a break in the thermo-couple $t$, the pointer K' operatively connects the contacts K² and KL, the energizing circuit for the relay R is completed by the connection then established through the contact KL between the conductor 9 and the supply conductor 2. The effect of this energization of the relay R is the same as that previously described as resulting on the connection of the contacts KH and K². To prevent the operation of the instrument K through the conductor KL from interfering with the operation of starting the oil heater into operation, a switch KL' may advantageously be provided for temporarily disconnecting contact KL from the conductor 9. The portion of the control mechanism shown in Fig. 1, comprising the instruments J and K and the mechanism through which they exercise their control features, may be, and as illustrated, is identical with mechanism disclosed and claimed in my said prior application, Serial No. 393,392, except that the two control contacts J² and J²⁰ shown herein replace a single elongated contact of said prior application which is like the contact K² of the instrument K, and except that in my prior application the conductor 13 is connected directly to the contact replaced herein by the two contacts J² and J²⁰. The control mechanism features common to the present application and my prior application possesses novel characteristics which are set forth and claimed in said prior application, and hence do not require further reference herein.

The temperature measurements furnished by the instrument J when the contacts S² and S³ engage the brushes U² and U³, respectively, particularly if the instrument J is a recording instrument as it ordinarily will be, show whether the two burners F are adjusted to insure similar combustion conditions as they should. The measurements of the temperatures to which the pyrometers T² and T³ respond thus provide a desirable check upon the efficiency of the manual control of the valve T³. By practically compelling attention to such control, a desirable manual attention to the operation of the oil heater is insured notwithstanding the tendency of attendants to give less than the proper amount of attention to the operation of a furnace provided with an efficient control system.

As previously stated, general principles and advantages of the present invention may be utilized and realized with apparatus varying widely from that shown in Fig. 1. For example, a device such as an ordinary thermo-couple responsive to furnace heating effects, and a radiation pyrometer subjected to temperature conditions significantly affected by variations in the percentage of excess air used, may advantageously be combined in a control instrument operating to automatically maintain a desirable constant heating effect and desirable combustion conditions.

One instance of such combination is illustrated in Fig. 3. The furnace A diagrammatically shown in Fig. 3 may be an oil heating furnace exactly like that shown in Fig. 1 and previously described. In Fig. 3, a thermo-couple $t$, responsive to the temperature to which the oil is heated in passing through the heater, has its terminals connected to a control instrument KA, which may be exactly like the instrument K, previously described, except that the control contact KC of the instrument K is omitted, and the contacts KL and KH are elongated so that their adjacent ends lie on opposite sides and in proximity to the position assumed by the pointer K' of the instrument KA when the temperature to which the thermo-couple $t$ responds is that which the apparatus is designed to maintain.

The instrument KA controls the fuel supply to the heater, the control being effected, as diagrammatically illustrated in Fig. 3, by means of a reversible motor IA employed to adjust the valve G in the fuel supply line F'. When the oil temperature to which the thermo-couple $t$ is subjected rises above its predetermined value and the pointer K' of the instrument KA connects the control contacts K² and KH, the motor IA is energized to adjust the valve G in the closing direction. The energizing circuit of the motor IA, then closed, comprises the supply conductor 2, conductor 8, control contact K², pointer K', control contact KH, conductor 252, running from the contact KH to one terminal of the motor IA, and the conductor 251, connecting a second terminal of the motor IA to the supply conductor 1. When the oil temperature to which the thermo-couple $t$ responds diminishes below its normal value, the motor IA is reversely energized to thereby effect an opening adjustment of the valve G. The energizing circuit, closed for this purpose, comprises the supply conductor 2, the conductor 8, the contact K², the pointer K', contact KL, a conductor 250 connecting the latter to a third terminal of the motor IA, and the conductor 251, which connects the said second terminal IA to the supply conductor I.

In Fig. 3, a radiation pyrometer T' is arranged to respond to conditions above the bridge wall of the furnace, as in the arrangement shown in Fig. 1. As diagrammatically shown in Fig. 3, the terminals of the thermo-couple of the pyrometer T' are connected to the galvanometer terminals of an instrument KB, which may be, and, as diagrammatically shown, is exactly like the instrument KA. The instrument KB controls the volume of combustion supporting air. As shown, it effects that control through a reverible motor IB employed to adjust a throttle valve or damper GA in the forced draft supply duct A⁶, though those skilled in the art will understand that the motor IB might effect a similar control by operating on the stack damper A⁵.

When the temperature to which the pyrometer

T' responds rises above a normal value, the motor IB is energized to adjust the damper GA in the opening direction, and thereby increase the excess air ratio. The energizing circuit for the motor IB then closed, includes the supply conductor 2, conductor 8, connecting the latter to the control contact $K^2$ of the instrument KB, conductor 260 connecting the contact KH to one terminal of the motor KB, and the conductor 251 connecting the common terminal of the motor IB to the supply conductor 1. When the temperature to which the device T' responds is below its predetermined value, the instrument KB energizes the motor IB in the direction to give a closing adjustment to the valve or damper GA, which by reducing the excess air ratio tends to raise the temperature to which the device T' responds. The energizing circuit for the motor IB, closed for this purpose, comprises the supply conductor 2, conductor 8, contacts $K^2$ and KL and pointer K' of the instrument KB, conductor 262, connecting the contact KL of instrument KB to the third terminal of the motor IB, and the conductor 251 connecting the second or common terminal of the motor to the supply conductor 1.

With the control apparatus shown in Fig. 3 the rate of heat generation is primarily dependent upon the exit oil temperature and is varied as required to prevent a significant departure in such temperature from its predetermined value. At the same time the instrument KB operates to insure the amount of combustion supporting air required for the maintenance of desirable combustion conditions and for the avoidance of local overheating of the oil and the tubes through which it flows on the portion of the furnace where such overheating is most apt to occur. Whenever the excess air percentage is so low as to give rise to unduly high temperatures in the region from which heat rays pass to the pyrometer T', the latter operates to increase the amount of excess air. Such excess air increase of itself tends to a reduction in the exit oil temperature. When such reduction in temperature manifests itself the thermo-couple $t$ and control instrument KA increase the fuel supply. This tends to a decrease in the excess air percentage which may be sufficient to again increase the significant furnace temperature, above their normal value. In such case the pyrometer T' again effects an increase in the supply of combustion supporting air. However, by the conjoint operation of the two controllers KA and KB, the rates of fuel and air supply are quickly brought to the values required for an approximately constant oil heating effect and for the maintenance of suitable combustion conditions, without any undue tendency of the control system to objectionable hunting.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:—

1. In the operation of a tube oil heating furnace, the method which consists in normally regulating combustion conditions in joint response to heat radiation in different portions of the furnace at varying distances from a portion of the furnace at which combustion is initiated, varying combustion conditions to diminish the furnace temperature in response to a predetermined increase in the heat radiation in a portion of the furnace relatively remote from said portion at which combustion is initiated, and means for diminishing the furnace temperature in response to a predetermined increase in the temperature to which oil is heated in passing through the furnace.

2. The combination with a furnace comprising a combustion chamber, of a plurality of fluid fuel burners associated with said chamber, fuel supply means comprising a plurality of discharge branches one for and supplying fuel to each of said burners, manually controlled valves in said branches, the relative adjustments of which determine the distribution of fuel among the different burners, means for separately measuring temperature conditions in said burners at points respectively adjacent the different burners, and control mechanism including said means for automatically regulating the total amount of fuel supplied to said burners.

3. In the operation of a continuous oil heating furnace comprising a combustion chamber and a plurality of separate burners associated therewith, the method which consists in separately measuring temperature conditions in said furnaces at points at which the temperatures are respectively dependent to a significant extent upon the operating effects of the different burners, manually regulating the distribution of fuel to the different burners in accordance with said measurements and utilizing said measurements collectively in effecting an automatic control of the total amount of fuel supplied to the different burners.

4. The combination with an oil heating furnace comprising a combustion chamber, a second chamber, a bridge wall between said chambers and over which heating gases pass from the combustion chamber into said second chamber, oil containing tubes located above both of said chambers, other oil containing tubes located in said second chamber, and means for introducing fuel into said combustion chamber at distributed points, of a combustion control system for said furnace including a device responsive to heat radiation from a portion of the furnace adjacent the top of the bridge wall, and other devices each responsive to heat radiation from a portion of the combustion chamber adjacent a corresponding point of fuel introduction therein, means associated with said devices for regulating combustion conditions in said chamber in joint response to the heat radiation effects impressed on the different devices, and means for operating said mechanism to diminish the combustion chamber temperature whenever the heat radiation to which the first mentioned device is subjected exceeds a predetermined amount.

FOSTER M. POOLE.